United States Patent [19]

Hazenbroek

[11] Patent Number: 4,993,113
[45] Date of Patent: Feb. 19, 1991

[54] ON-LINE THIGH DEBONER

[76] Inventor: Jacobus E. Hazenbroek, Burg de Zeeuwstraat 52, Numansdorp, Netherlands

[21] Appl. No.: 472,631

[22] Filed: Jan. 30, 1990

Related U.S. Application Data

[63] Continuation-in-part of Ser. No. 331,968, Apr. 3, 1989, Pat. No. 4,932,102.

[51] Int. Cl.⁵ ............................................. A22C 25/16
[52] U.S. Cl. ..................................... 452/136; 452/167
[58] Field of Search ............................. 17/46, 11, 1 G

[56] References Cited

U.S. PATENT DOCUMENTS

| | | | |
|---|---|---|---|
| 3,965,535 | 6/1976 | Kaplan et al. | 17/11 |
| 4,377,884 | 3/1983 | Viscocosi | 17/11 |
| 4,843,682 | 7/1989 | Bornen | 17/11 |
| 4,893,378 | 1/1990 | Hazenbroek | 17/11 |

Primary Examiner—Willis Little
Attorney, Agent, or Firm—Thomas & Kerr

[57] ABSTRACT

The present invention comprises a method and apparatus for automatically stripping the meat from the bones of a poultry part. The deboner (11) carries a plurality of deboning modules (12) along a processing path. Each deboning module (12) includes a rotary bone holder (38) for supporting the poultry part and a stripper assembly (41) for stripping the meat from the bone. The stripper assembly (41) has stripper blades (62) which engage the meat on the bone and strip the meat from the bone as the stripper assembly (41) moves along the length of the bone. As the blades (62) strip the meat from the bone, the rotary bone holder (38) can be rotated to thus rotate the bone with respect to the meat to assist in the meat removal.

23 Claims, 3 Drawing Sheets

ON-LINE THIGH DEBONER

REFERENCE TO RELATED APPLICATION

This is a continuation-in-part of U.S. patent application Ser. No. 331,968 filed Apr. 3, 1989, now U.S. Pat. No. 4,932,102.

FIELD OF THE INVENTION

This invention relates in general to a method and apparatus for removing the meat from the thigh bones of poultry. More particularly, the invention concerns a method and apparatus for automatically removing the meat from the thigh bones of poultry while the thigh bones remain connected to a poultry leg bone suspended from a poultry processing line, by moving the thigh bone and its meat with respect to each other longitudinally along the length of the thigh bone to strip the meat from the bone without requiring the thigh bone be first separated from the leg bone.

BACKGROUND OF THE INVENTION

When removing the meat of a poultry thigh from a thigh bone, a common practice is to cut the thigh away from the leg and carcass of the bird and to scrape along the length of the thigh bone with a tool to strip the meat from the bone. For example, two or more notched blades can be moved into contact with the meat on the thigh bone with the notches of the blades straddling the bone. The bone is moved along its length through the notches of the blades, and the blades tend to scrape against the bone to pull the meat away from the bone and along the length of the bone until the bone passes completely through the notches of the blades. Examples of this type of meat stripping removal are found in U.S. Pat. Nos. 3,672,000, 4,327,463 and 4,495,675.

One advantage of removing the bones from the meat of poultry is that the bone does not have to be cooked when the meat is cooked, thus saving energy. Further if the bone is removed from the meat prior to cooking, it can be conveniently saved and used for bone meal or related products. Also, the meat can be used without the bone in sandwiches and in other situations where a bone is unacceptable.

A problem with the prior art deboning equipment known to the inventor is that before removing the meat from the thigh bone of poultry products, the thigh bone first must be separated from the leg bone. This requires the carcass to first be removed from a poultry processing line and the carcass thigh separated from the legs and back, and then the thighs to be manually placed on a deboning machine before the deboning operation can be performed.

SUMMARY OF THE INVENTION

Briefly described, the present invention comprises a method and apparatus for removing the meat from the thigh bones of a poultry part while the thigh bones remain connected to a leg bone of the poultry part, without requiring the thighs first to be separated from the legs before removing the thigh meat. In one embodiment of the invention the deboning apparatus has a plurality of deboning modules which move about a closed processing path and are supported at their upper ends by an upper conveyor and at their lower ends by a lower conveyor. The upper and lower conveyors revolve about upper and lower pairs of sprockets, respectively, carrying the deboning modules along an endless processing path. Each deboning module includes a rotary bone holder positioned at the upper end of the deboning module adjacent the upper conveyor, and a pair of notched stripper blades. The stripper blades are vertically movable into engagement with a thigh bone suspended by its leg bone which is held by the bone holder to strip the meat from the thigh bone.

The rotary bone holders have a retaining yoke into which the knuckle of the leg bone remote from the thigh bone is placed to invertedly suspend a connected leg and thigh bone above the stripper blades with the connected thigh bone hanging downwardly.

As the bone holders carry the connected legs and thighs along the processing path prior to the stripping of the meat from the thigh bone, the connected legs and thighs are engaged by a first positioning wheel. The positioning wheel has a plurality of protrusions and the knee joint connecting the legs and thighs engages the positioning wheel between the protrusions. The positioning wheel forces the knee joint between an upper guide rod and a lower guide rod and the leg and thigh bend at the knee joint so as to open the knee joint. A pair of stationary cutting blades are positioned on opposite sides of the path of the bent knee joint. The cutting blades cut through the skin and tissue surrounding the knee joint to create a guide incision at the top of the meat of the thigh.

As the connected legs and thighs proceed along the processing path, the stripper blades are moved upwardly and into engagement with the meat of the thigh bone at the guide incision previously cut into the skin and tissue of the knee joint. The notched portions of the stripper blades straddle the thigh bone, and the stripper blades are pulled along the length of the bone to scrape the meat from the bone. As the meat is stripped from the bone, the bone can be rotated with respect to the meat to enhance the stripping action.

After the stripper blades have been lowered, scraping the meat away from the thigh bone, the thigh bone is passed over a cutter positioned immediately adjacent the bottom end of the thigh bone. The cutter completely severs any meat extending between the removed meat and the thigh bone, thus completing the removal of the thigh meat from the thigh bone.

Upon the completion of the removal of the meat from the thigh bone, the connected leg and the thigh bone proceed along the processing path into engagement with a second positioning wheel. The joint between the leg and the thigh bone is received between the protrusions of the second positioning wheel and is progressively moved between an upper guide and a lower guide rail causing the leg and thigh bones bend at the connecting knee joint, causing the joint to open. The opened knee joint is engaged by a stationary cutting blade positioned adjacent the path of the joint and the blade severs the tendons which maintain the connection between the leg and thigh bone. Thus, the thigh bone is separated from the leg and can drop away from the leg for removal as the leg continues on for further processing.

A second embodiment of the invention comprises a similar upper conveying system for moving the connected leg end thigh, but instead of having the pair of striper blades includes a pair of meat stripping plates defining a slot, with the plates oriented so that this slot diverges from the path of the leg. At least some portions of the facing edges of the slot are formed as cutting edges. The knee joint connecting the leg and thigh bones moves into an end of the slot between the opposing cutting surfaces of the slot. The cutting surfaces initially extend horizontally and engage the meat of the thigh, cutting through the skin and tissue surrounding the knee joint to begin the removal of the meat. After an initial cut in the meat of the thigh has been made, the facing edges of the slot begin to slope downwardly as the leg and thigh move along the processing path. The downwardly sloped surfaces of the striping plates progressively scrape the meat of the thigh downwardly and along the length of the thigh bone. As the meat is being scraped from the thigh bone, the rotary bone holder can rotate so as to turn the thigh bone for cleaner removal of the meat from the thigh bone.

Upon the complete removal of the meat, the connected leg and scraped thigh bone are moved into contact with a second positioning wheel as previously described to separate the thigh bone from the leg.

Therefore, it is an object of this invention to provide an improved method and apparatus whereby the meat of poultry thigh bones and similar animal bones can be expediently and reliably removed from the bone.

Another object of this invention is to provide a method and apparatus for removing the meat from the thigh bone of a poultry part while the thigh bone remains connected to a leg bone of the poultry part without first requiring the separation of the thigh bone from its connected leg bone.

Another object of the invention is to provide a method and apparatus for removing the meat from the thigh bone of a poultry part while the thigh bone remains connected to a leg bone of the poultry part and for automatically separating the thigh bone from its connected leg after the meat has been removed from the thigh bone.

Other objects, features and advantages of the present invention will become apparent upon reading the following detailed description when taken in conjunction with the accompanying drawings.

DETAILED DESCRIPTION OF THE PREFERRED EMBODIMENTS

Figure 1:
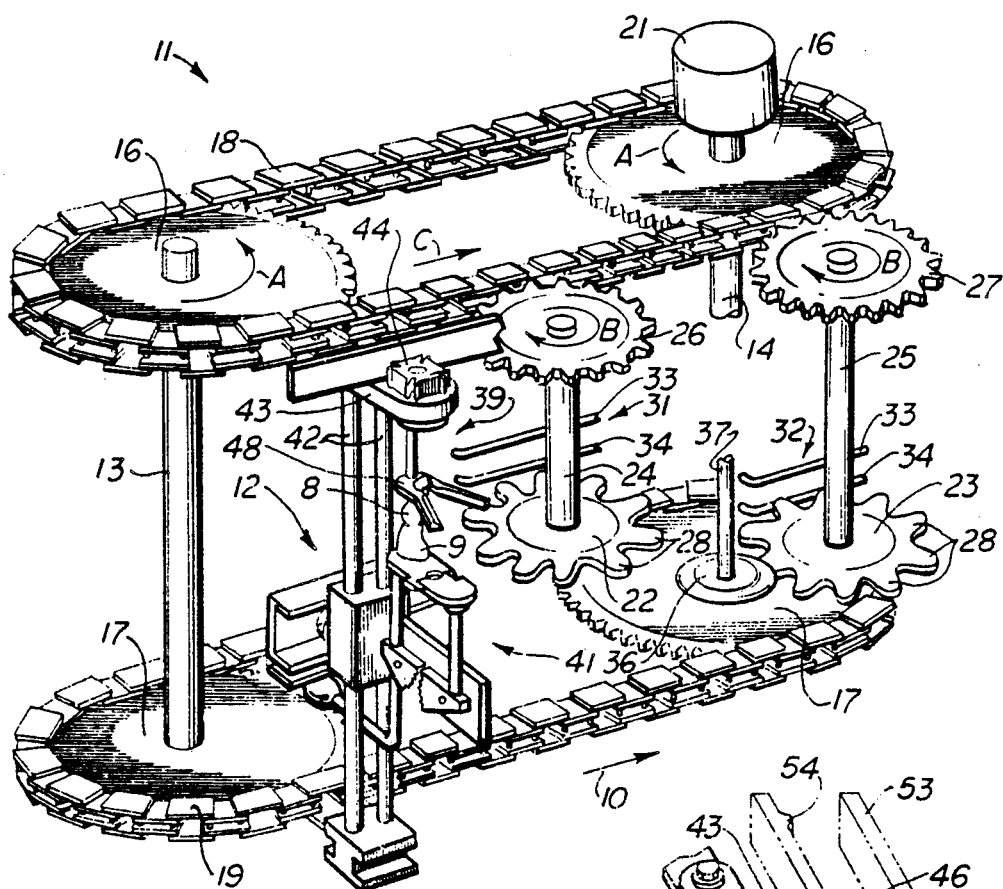
FIG. 1 is a perspective illustration of the operative elements of the on-line thigh deboning apparatus, showing only one deboning module mounted thereon for clarity.

Referring now in greater detail to the drawings, in which like parts indicate like numerals throughout the several views, FIGS. 1-7 illustrate a first embodiment of the invention, wherein FIG. 1 illustrates the on-line poultry thigh deboner 11 in perspective, with only one deboning module 12 shown, the other deboning modules having been removed for clarity. Each deboning module is arranged to receive and move the connected leg 8 and thigh 9 of a bird along a processing path 10 which debones the thigh 9 and separates the thigh bone 9a from the leg 8. It will be understood that a plurality of deboning modules 12 will be placed at spaced intervals along the perimeter of the thigh deboner 11. Much of the support structure is not shown for clarity.

The deboner 11 includes a support framework (not shown) with vertical sprocket shafts 13 and 14 rotatably supported at opposite ends of the framework. Upper and lower pairs of sprockets 16 and 17 are mounted at the upper and lower portions of sprocket shafts 13 and 14. Extending around the upper and lower sprockets 16 and 17 respectively are upper and lower conveyor chains 18 and 19 in an endless loop to define a processing path. A motor 21 is connected in a driving relationship with sprocket shaft 14 to drive both chain conveyors 18 and 19 in a counterclockwise direction as indicated by arrows A.

Arranged between the ends of the deboner 11 along the processing path 10 are first and second positioning wheels 22 and 23. The positioning wheels 22 and 23 are each linked by upwardly extending sprocket shafts 24 and 25 respectively to a toothed sprocket 26 and 27, each positioned in driven relationship with the outwardly facing surface of the upper conveyor chain 18. The engagement of the toothed sprockets 26 and 27 with the outer surface of upper conveyor chain 18 causes the toothed sprockets 26 and 27 to rotate in a clockwise direction, shown by arrows B, in response to the opposite, counterclockwise movement of the conveyors 18 and 19. Each positioning wheel 22 and 23 has a plurality of horizontally extending protrusions or fingers 28 arranged in spaced relationship about the circumference of each of the positioning wheels 22 and 23. A pair of guide rails are positioned adjacent each positioning wheel, with the first pair of guide rails 31 positioned adjacent positioning wheel 22 and the second pair of guide rails 32 positioned adjacent positioning wheel 23. The protrusions 28 of the positioning wheel 22 pass between the upper and lower guide rails 33 and 33 of the first pair of guide rails 31 as the positioning wheel 22 rotates in response to the movement of the upper conveyor 18. Likewise, the protrusions 28 of the second positioning wheel 23 pass between the upper and lower guide rails 33 and 34 of the second pair of guide rails 32.

A rotary disk cutter 36 is positioned adjacent the outside edge of the framework, immediately preceding the second positioning wheel 23 along the processing path 10. The cutter 36 is connected by a rotary drive shaft 37 to a motor (not shown) which drives the cutter 36.

Figure 2:
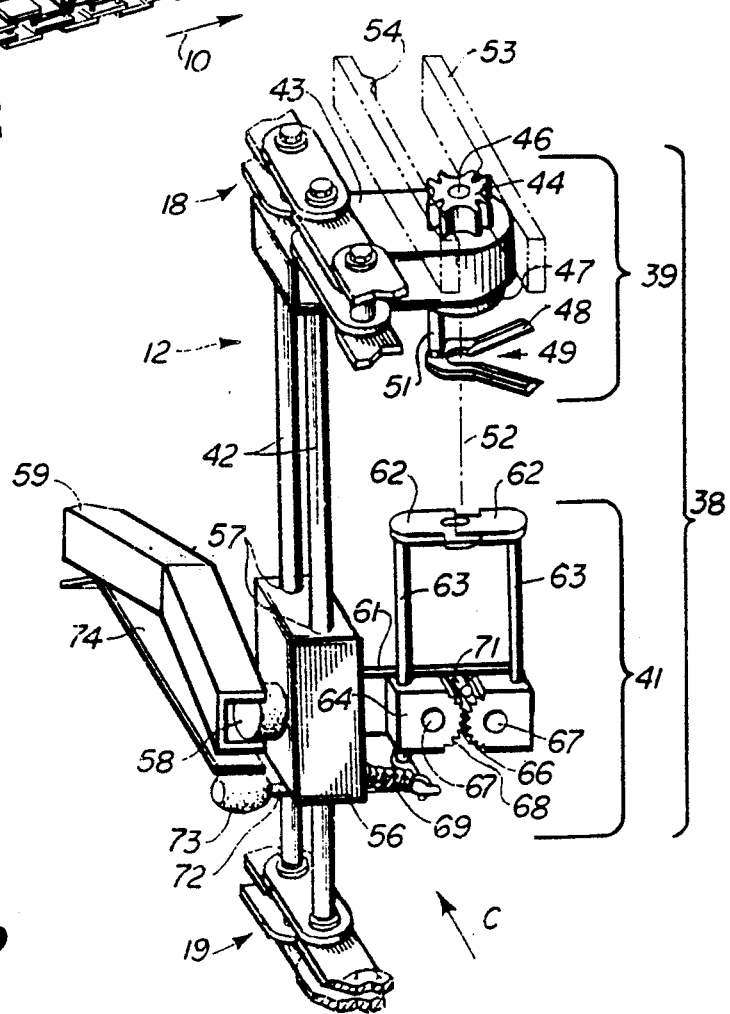
FIG. 2 is a perspective illustration of a deboning module.

Deboning modules 12, such as the single module 12 illustrated in FIG. 2, are mounted on and carried about the deboner 11 by the rotation of the upper and lower conveyor chains 18 and 19 in a counter-clockwise direction as shown by arrow A. FIG. 2 shows a deboning module 12 in greater detail, including a carrier assembly 38, rotary bone holder 39 positioned at the top of the carrier assembly 38, and a stripper assembly 41 positioned below the bone holder 39 on the carrier assembly 38. The carrier assembly 38 includes a pair of parallel vertical guide bars 42 which extend between the upper and lower conveyor chains 18 and 19. The rotary bone holder 39 is fixedly mounted to the top portion of the carrier assembly 38 adjacent the upper conveyor 18 while the stripper assembly 41 is slidably mounted upon the vertical guide bars 42 of the carrier assembly 38 and is movable vertically toward and away from the bone holder 39 along the length of the guide bars 42.

Each rotary bone holder 39 has a carrying block 43 rigidly mounted to the upper conveyor chain 18. On the top surface of the carrying block 43, at the end of the carrying block 43 furthest from the upper conveyor chain 18, is a bone holder cam 44. Vertical axle 46 is rigidly attached at its upper end to the bone holder cam 44 extending through the carrying block 43 and rigidly mounting at its lower end to cylindrical support block 47. An open ended horizontal receiving yoke 48, having a substantially C-shaped design with outwardly diverging side portions defining a retaining yoke gap 49, is mounted underneath the carrying block 43 by an upright stem 51. The upright stem 51 is offset from the center of the support block 47 such that vertical axis 52 extends approximately through the center of the yoke gap 49 of the receiving yoke 48.

As the deboning module 12 (FIG. 1) is moved along the processing path 10 in the direction of arrow C, the bone holder cam 44 is passed along a bone holder cam track 53 having a plurality of turning protrusions 54 spaced apart from one another along the length of the bone holder cam track 53. The bone holder cam 44 is turned 90 degrees as it engages each turning protrusion 54. Each time the bone holder cam 44 is rotated 90 degrees, the rotary bone holder 39 is caused to rotate 90 degrees as well.

The stripper assembly 41 comprises a carrier block 56 having a pair of cylindrical openings 57 circumscribed about the guide bars 42. A cam roller 58 is rotatably mounted to the carrier block 56 and is received in a stripper assembly cam track 59. The cam roller 58 follows the contour of the cam track 59 as the deboner module 12 moves along the processing path to raise and lower the stripper assembly 41 along the guide bars 42.

A stripper block 61 is rigidly mounted to and carried by the carrier block 56. A pair of notched stripping blades 62 are each affixed to the upper portion of a blade support arm 63. Each support arm 63 is mounted at its lower end to a half gear 64 and 66. The half gears 64 and 66 are arranged opposing one another and are secured to the stripper block 61 by a pivot pin 67. Each half gear 64 and 66 includes teeth portions 68. When half gear 64 is pivoted outwardly, its teeth 68 engage those of the opposing half gear 66, causing the stripper blades 62 to tilt away from one another, opening a gap therebetween. When the rotation of half gear 64 is reversed, the teeth 68 of half gears 64 and 66 engage in an opposite direction to close the blades 62 inwardly toward each other.

Springs such as a pair of coil tension springs 69 connected at their upper ends to carrier block 56 and at their lower ends to the lower ends of the blade support arms 63 urge the stripper blades 62 toward engagement with each other. A guard pin 71 is mounted above the teeth 68 of the half gears 64 and 66 to prevent debris from fouling the gear teeth 68.

A cam arm 72 is rigidly mounted at one end to the first half gear 64 extending beneath and beyond the carrier block 56 and between the vertical guide bars 42. Cam follower 73 attaches to the opposite end of the cam arm 72.

As illustrated in FIGS. 1 and 2, a stripper blade cam track 74 is positioned on the side of the carrier block 56 opposite from the stripper assembly 41 below the stripper assembly cam track 59. Cam roller 58 follows along the stripper assembly cam track 59 while the cam follower 73 engages the stripper blade cam track 74. As the stripper assembly 41 revolves about the thigh deboner 11, the movement of the cam follower 73 along the stripper blade cam track 74 causes the cam follower 73 to be raised and lowered relative to the carrier block 56, causing the stripper blades 62 to open and close.

In operation of the thigh deboning apparatus 11, illustrated in FIG. 1, a leg 8 and thigh 9 of a poultry part 6, which remain connected to each other at the knee joint 7 between the two bones, are placed on a rotary bone holder 39 of a deboning module 12. The knuckle of the leg bone 8a which is most remote from the thigh bone 9a of the poultry part 6 is placed in the center of the horizontally aligned C-shaped retaining yoke 48, and the leg 8 and thigh 9 are invertedly suspended from the retaining yoke 48 with the thigh 9 hanging below the leg 8, still connected to the leg 8. As the upper and lower chain conveyors 18 and 19 revolve about sprockets 16 and 17, the connected leg 8 and thigh 9, carried by bone holders 39, are moved along a processing path 10 in the direction of arrow C.

Figure 3:
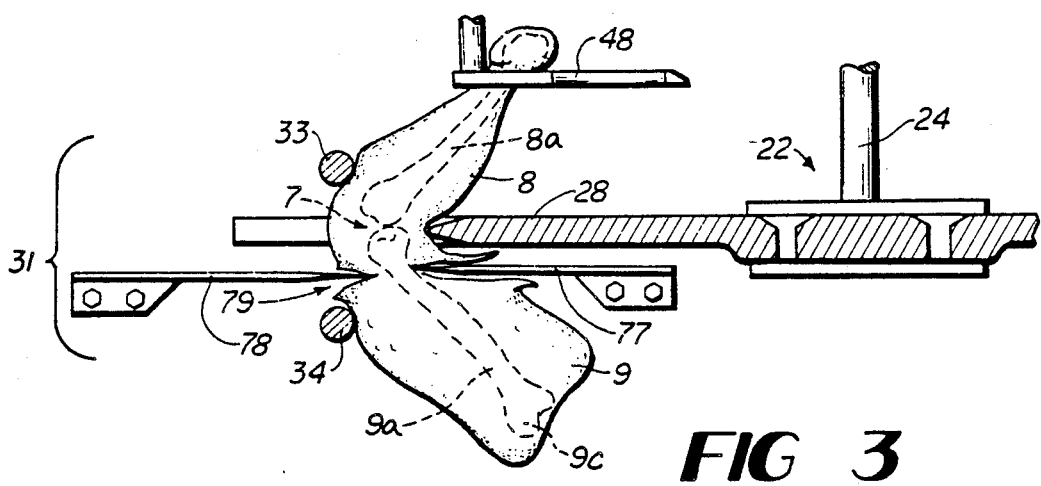
FIG. 3 is an end view of the first positioning wheel urging the connecting knee joint between the leg and the thigh of a bird between the guide rails for engagement by the cutting blades to create a guide incision.

The connected leg 8 and thigh 9 are initially engaged at the start of the processing path by the first positioning wheel 22. As shown in FIG. 3 the protrusions 28 of the positioning wheel 22 engage opposite sides of the knee joint 7 connecting the leg bone 8a and thigh bone 9a together, as the positioning wheel 22 rotates in the opposite direction from the conveyor chains 18 and 19. The rotation of the positioning wheel 22 is due to the engagement of the toothed sprocket 26, linked to the top of positioning wheel 22 by sprocket shaft 24, with the outer edge of the upper chain conveyor 18 and forces the knee joint 7 between a first pair of guide rails 31 vertically spaced one above the other. This rotation also forces the leg 8 into contact with the uppermost guide rail 33 while the thigh 9 is urged into contact with the lower guide rail 34 causing the knee joint 7 to bend and open in response to further rotation of the positioning wheel 22.

FIG. 3 illustrates the angle of the leg 8 and thigh 9 as they are engaged by the positioning wheel 22 and forced into contact with the upper and lower guide rails 33 and 34 respectively. A pair of stationary cutting blades 77 and 78 are positioned in alignment with the upper knuckle of the thigh bone 9a closest the knee joint 7, with one blade 77 mounted directly below the surface of the positioning wheel protrusions 28, and the other blade 78 mounted adjacent to the opposite side of the guide rails 31 extending partially through the vertical spacing between the guide rails 31. As the connected leg 8 and thigh 9 move along in sliding contact with the upper and lower guide rails 33 and 34 of the first pair of guide rails 31, the knee joint 7 is moved toward engagement with the stationary cutting blades 77 and 78. The cutting blades 77 and 78 which cut into the skin and tissue surrounding the upper knuckle of the thigh bone 9a to create guide incision 79 in the meat 9b of the thigh bone 9a. At the same time, the bone holder cam 44 engages the turning protrusions 54 of the bone holder cam track 53 rotating the connected leg 8 and thigh 9 during engagement with the cutting blades 77 and 78 to thus circumscribe the guide incision 79 completely around the upper knuckle of the thigh bone 9a.

Figure 4:
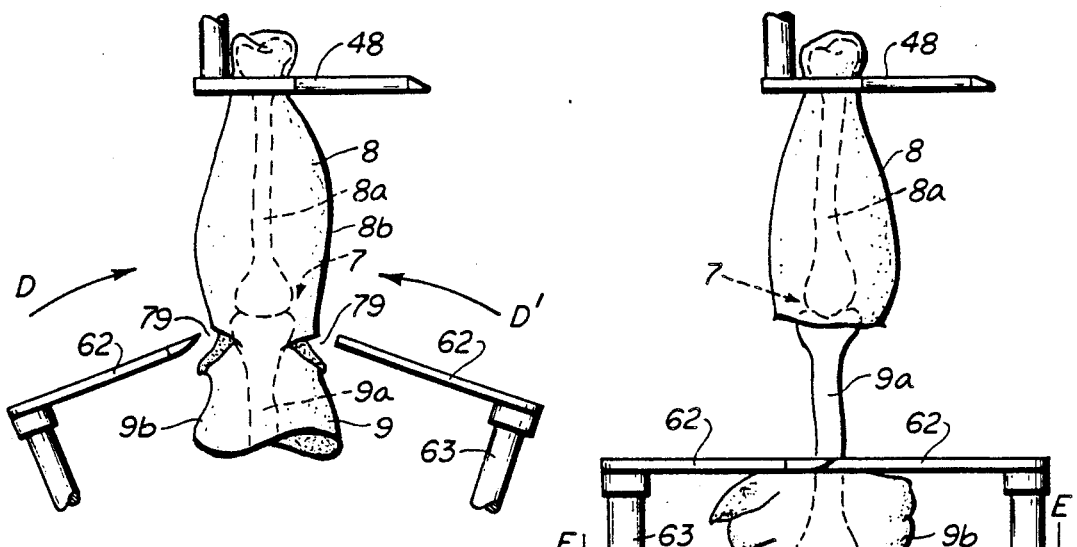
FIG. 4 is an end view of the stripping blades moving into contact with the thigh bone at the guide incision.

After passing through the cutting blades 77 and 78 at the first positioning wheel 22, the deboning operation of the thigh deboner 11 begins whereby the meat 9a is stripped from the thigh bone 9a with the thigh bone 9b remaining connected to a leg bone 8a. As shown in FIGS. 1, 2 and 4, as the deboning module 12 proceeds along the processing path in the direction of arrow C, the cam roller 58 begins to move along the upwardly sloped upper cam track 74. Simultaneously, the lower cam track 76 urges the cam follower 73 protruding from beneath carrier block 56 downwardly thereby causing the counterclockwise rotation of the first half gear 64. The teeth 68 of the first half gear 64 engage the opposing teeth 68 of the second half gear 66 to rotate the second half gear 66 in a clockwise direction. Thus, the blade support arms 63 are spread apart, moving the stripper blades 62 to their opened receiving position spaced apart from one another.

As the deboning module 12 progresses along the processing path, the stripper blades 62 continue to open while the entire stripper assembly 41 is moved upwardly toward the rotary bone holder 38. Prior to the stripper assembly 41 completing its upward movement, the stripper blades 62 begin moving toward each other. The lower cam track 76 begins to allow the cam follower 73 to move upwardly thus closing the stripper blades 62 in the directions indicated by arrows D and D, shown in FIG. 4. This action continues until the stripper assembly 41 reaches its zenith wherein the notched stripper blades 62 are substantially closed about the thigh bone 9a at a position just below the knee joint 7 between the leg 8 and thigh 9, inserting into the guide incision 79 cut into the meat 9b of the thigh bone 9a.

Figure 5:
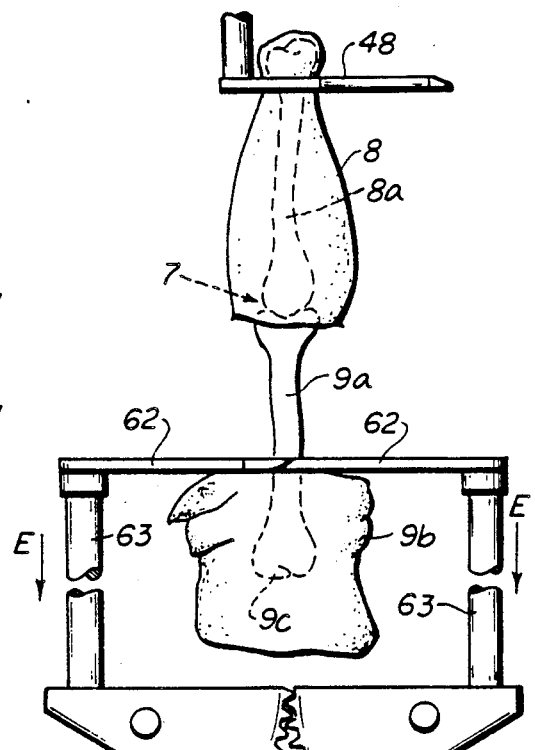
FIG. 5 is an end view of the stripping action of the stripping blades in contact with the thigh bone to remove the meat from the bone.

After the stripper blades 62 have moved into contact with the thigh bone 9a, the upper cam track 74 begins to slope downwardly urging the cam follower 73 downward. This downward movement of the cam follower 73 causes the stripper assembly 41 to descend along the vertical guide rails 43 in the direction of arrow E as shown in FIG. 5. As FIG. 5 illustrates, the stripper blades 62 are pulled in scraping contact with the thigh bone 9a along the length of the thigh bone 9a to strip the thigh meat 9b from the thigh bone 9a as they proceed. During this scraping operation, the bone holder cam 44 (FIG. 2) engages the turning protrusions 54 of the bone holder cam track 53. As the cam 44 engages each turning protrusion 54, the bone holder 38 is rotated about its vertical axis 52 thereby rotating each connected leg 8 and thigh 9 90 degrees as the cam 44 comes into contact with each turning protrusion 54 as cam track 53. As a result, the thigh bone 9a is twisted relative to the stripper blades 62 thus allowing a much cleaner and more complete removal of the thigh meat 9b from the thigh bone 9a. The downward movement of the stripper assembly 41 continues along the thigh bone 9a and over the lower knuckle 9c at the free end of the thigh bone 9a, removing the thigh meat 9b from the length of the thigh bone 9a.

Figure 6:
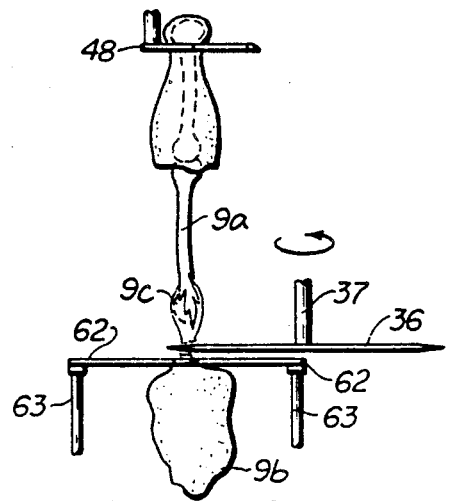
FIG. 6 is an end view of the rotary disk cutter severing any meat left clinging from the end of the thigh bone after the removal operation.

As the connected leg 8 and thigh 9 continue to move along the processing path with the thigh meat 9b of the thigh bone 9a substantially removed from the thigh bone 9a, the rotary disk cutter 36 is engaged to separate any strips of thigh meat 9b which remain in clinging contact with the thigh bone 9a. As shown in FIG. 6, the rotary disk cutter 36 rotates continually and engages the clinging thigh meat 9b at a point immediately adjacent the lower knuckle 9c at the free end of the thigh bone 9a. Thus, the meat 9b of the thigh bone 9a is completely removed from the thigh bone 9a.

Figure 7:
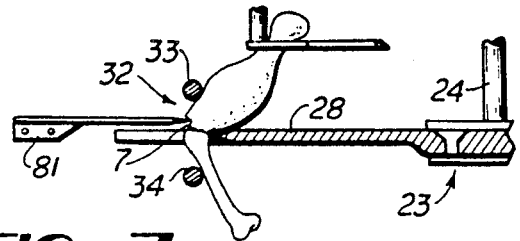
FIG. 7 is an end view of the second positioning wheel urging the connecting joint between the leg and thigh bones of a bird between a second pair of guide rails and into engagement with a stationary cutting blade.

Following the completion of the removal of the thigh meat 9b from the thigh bone 9a by the stripper blades 62 and the separation of any clinging strips of thigh meat 9b by the disk cutter 36, the connected leg bone 8a and thigh bone 9a pass into engagement with a second positioning wheel 23 (FIG. 1). The second positioning wheel 23 is rotated in an opposite direction from the conveyor chains as indicated by arrow B by the engagement of a toothed sprocket 27, linked to the second positioning wheel 23 by a sprocket shaft 24, with the upper conveyor chain 18. As illustrated in FIG. 7, when the second positioning wheel 23 rotates, the protrusions 28 arranged about the circumference of the second positioning wheel 23 are rotated into engagement with the opposite sides of the knee joint 7 between the connected leg 8 and thigh 9, urging the knee joint 7 between a second pair of guide rails 32. The leg 8 is forced into contact with the upper guide rail 33 of the second pair of guide rails 32, the thigh bone 9a is forced against the lower guide rail 34, and the knee joint 7 is urged into the vertical space between the guide rails 33 and 34. As the knee joint 7 is progressively urged between the guide rails 33 and 34, it is forced open.

A stationary joint cutting blade 81 is positioned adjacent to the outside of the guide rails 33 and 34 opposite the positioning wheel 23 aligned with the opening in the bent knee joint 7 between the leg bone 8a and thigh bone 9a. The knee joint 7 is bent as the positioning wheel 23 rotates further, causing the knee joint 7 to open up and expose the connecting tendons between the leg bone 8a and thigh bones 9a. The stationary joint cutting blade 81 engages the tendons which connect the leg bone 8a and thigh bone 9a, cutting through the opening of the bent knee joint 7 and severing the connecting tendons.

Once these tendons are severed, the thigh bone 9a is completely separated from the leg bone 8a and can be dropped below the deboner 11 into a removal bin (not shown). With the thigh bone 9a thus removed, the leg bone 8a can proceed along the processing path for further processing.

DETAILED DESCRIPTION OF A SECOND EMBODIMENT

Figure 8:
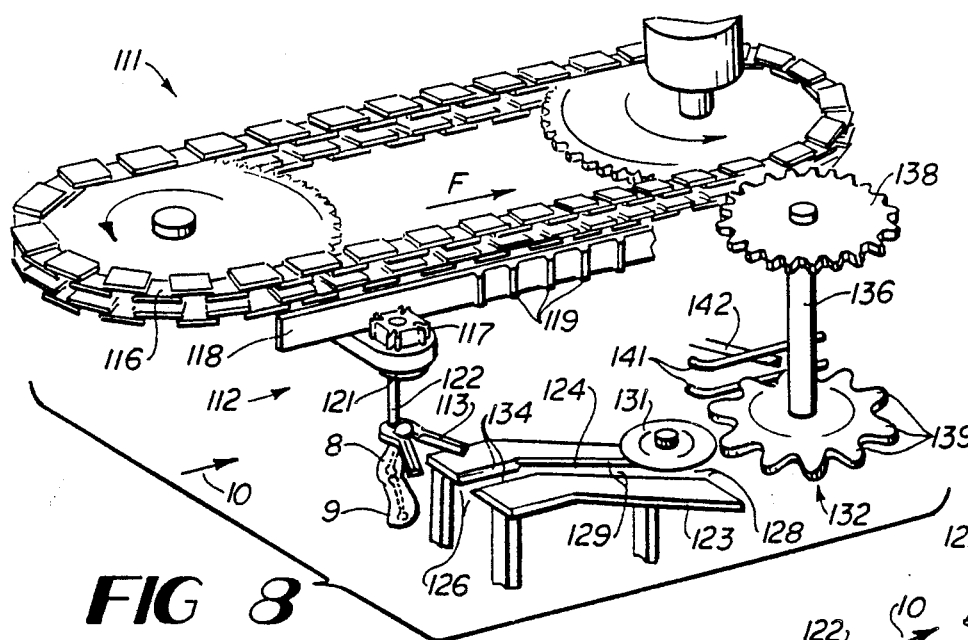
FIG. 8 is a perspective illustration of the second embodiment of the on-line thigh deboning apparatus, showing only one bone holder carrying a connected leg and thigh.

FIGS. 8-11 illustrate a second embodiment of the online thigh deboner 111, showing only one rotary bone holder 112 mounted thereon and omitting much of the support structure of the deboner 111 for clarity. As FIG. 8 shows, in this second embodiment, a leg 8 and thigh 9 of a poultry part 6 remain connected to one another at a knee joint 7 is placed with the upper knuckle of the leg bone 8a most remote from the thigh 9 in a retaining yoke 113 of the bone holder 112. The retaining yoke 113 is horizontally aligned, having a substantially C-shaped design with divergently extending end portions. With the knuckle of the leg 8 placed within the retaining yoke 113, the connected leg 8 and thigh 9 are invertedly suspended below the bone holder 112 with the thigh 9 hanging below the leg 8.

Above the retaining yoke 113 is a carrier block 114 which is mounted upon and carried by an overhead conveyor 116 about a processing path 10 in the direction of arrow F. Rotatably affixed to the top of the carrier block 114 is a bone holder cam 117. The bone holder cam 117 passes along a cam track 118 as it is carried by the overhead conveyor 116 about the processing path 10, and as the cam 117 passes along the cam track 118, it engages a plurality of turning protrusions 119 arranged at spaced intervals along the length of cam track 118. As the cam 117 engages each turning protrusion 119 it is turned 90 degrees. Affixed to the underside of the carrier block 114 is a cylindrical support block 121 linked to the retaining yoke 113 by a rigid upright stem 122 mounted to the support block 121 at a position offset from the center of the cylindrical support block 121.

Along the length of the processing path 10 are positioned a pair of meat stripping plates 123. The stripping plates 123 perform the same function as the first positioning wheel and the stripper assembly of the first embodiment to remove the meat 9b from the thigh bone 9a The stripping plates 123 extend parallel to and spaced apart from one another, the spacing between the stripping plates 123 forming a stripping slot 124 aligned with the path of the connected leg 8 and thigh 9 being carried by a bone holder 112. The stripping slot 124 has a horizontally aligned input end 125 facing the direction of movement of the leg 8 and thigh 9 and a downwardly sloping stripping portion 127 extending from the input end 125 to a discharge end 128 of the stripping plates 123. The sides of the stripping slot 124 are formed by the opposed meat stripping edges 129 of each stripping plate 123 which extend parallel to each other along the length of the stripping plates 123.

Mounted above the discharge end 128 of the stripping slot 124 is a rotary disk cutter 131 in a position to separate any strips of thigh meat 9b which remain clinging to the thigh bone 9a after the stripping operation has been performed. Behind the disk cutter 131 is a positioning wheel 132 for separating a scraped thigh bone 9a from its connected leg bone 8a. The positioning wheel 132 has a plurality of protrusions 133 arranged about its circumference which are rotated into engagement with the knee joint 7 between the scraped thigh bone 9a and the leg 8.

Figure 9:
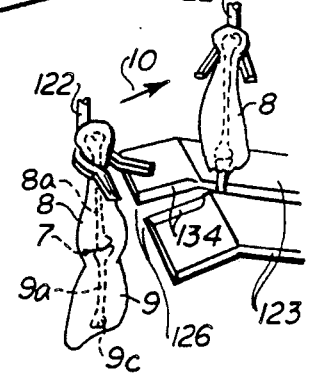
FIG. 9 is a perspective illustration of a connected leg and thigh entering the slot of the meat stripping plate.
Figure 10:
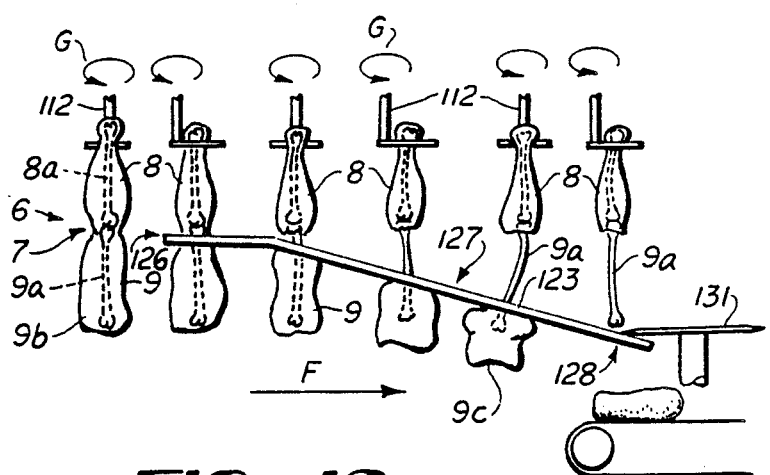
FIG. 10 is a side view of the progressive removal of the meat from a thigh bone passing along the stripping plate.
Figure 11:
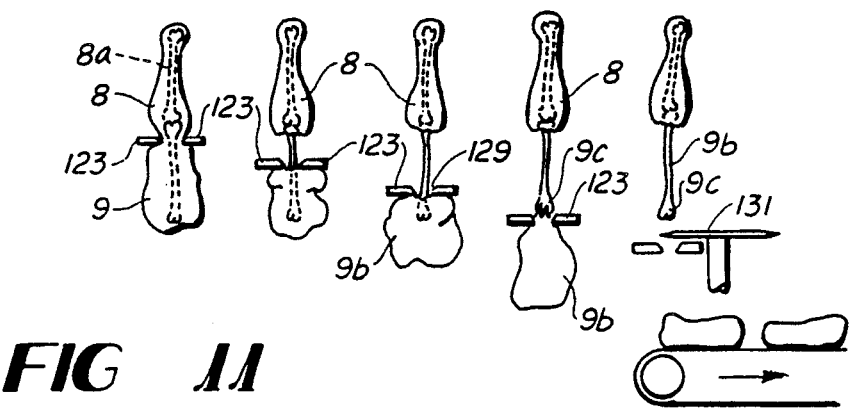
FIG. 11 is an end view of the progressive removal of the meat from a thigh bone passing between the cutting surfaces of the stripping plate.

FIGS. 9-11 illustrate the meat removal operation of the second embodiment of the deboner 111. As shown in FIG. 9, as the connected leg 8 and thigh 9 are carried along the processing path 10 by the bone holder 112, it enters the stripping slot 124 at the input end 126 of the stripping slot 124. The knee joint 7 connecting the leg bone 8a and thigh bone 9a passes slightly above the opposed cutting surfaces 129 of the slot 124 so that a pair of cutting edges 134 arranged on either side of the slot 124 at the input end 126 of the stripping slot 124 cut through the skin and tissue surrounding the upper knuckle of the thigh bone 9a to start the stripping operation.

The connected leg 8 and thigh 9 are moved along a horizontal plane by the movement of the overhead conveyor 116 (FIG. 8) as the thigh 9 is pulled along the slot 124 of the stripping plates 123. As the connected leg 8 and thigh 9 are so moved, the stripping surfaces 129 (FIGS. 10 and 11) which extend along the downwardly sloping portion 127 of the stripping plates 123 engage and progressively scrape the meat 9b from the thigh bone 9a. At the same time, the bone holder cam 117 (FIGS. 8 and 10) engages the turning protrusions 119 of cam track 118 causing the cam 117 to rotate in the direction of arrow G. The cylindrical support block 121 is rotated with the rotation the bone holder cam 117 causing the retaining yoke 113 to rotate 90 degrees upon engagement of the bone holder cam 117 with each turning protrusion 119. Thus, the thigh bone 9a is rotated as the thigh meat 9b is scraped from the thigh bone 9a, providing for a cleaner and more complete removal of the thigh meat 9b from the thigh bone 9a.

At the end of the meat removal operation, the connected leg 8 and thigh bone 9a are passed adjacent the rotary disk cutter 131 to complete the meat removal from the thigh bone 9a. After the disk cutter 131 completes the meat removed, the connected leg 8 and thigh bone 9a are engaged by the positioning wheel 132 to separate the thigh bone 9a from the unprocessed leg 8.

The positioning wheel 132 is attached to a drive shaft 136 which is connected to a toothed sprocket 138 at its uppermost end. The toothed sprocket 138 is positioned in a driven relationship with the overhead conveyor 116 and rotates with the movement of the overhead conveyor 116, thus rotating the positioning wheel 132. The positioning wheel 132 has a plurality of protrusions or fingers 139 arranged about the circumference of the positioning wheel 132 and extending outwardly from the positioning wheel 132. As the positioning wheel 132 rotates, the protrusions 139 are rotated into engagement with the connected leg and thigh bone 9a. The knee joint 7 connecting the leg bone 8a and thigh bone 9a is bent open as the protrusions 139 urge the joint 7 between a pair of positioning rails 141. The opened knee joint 7 is passed into engagement with a stationary cutting blade 142 to sever the connecting tendons between the leg bone 8a and thigh bone 9a to automatically separate the scraped thigh bone 9a from its connected leg.

While certain embodiments of the invention have been disclosed as representing the invention, it will be understood that variations and modifications thereof can be made without departing from the spirit and scope of the invention as described in more detail by the following claims.

I claim:

1. A method of deboning poultry thighs while connected to their legs, comprising the steps of:
    moving connected legs and thighs in spaced series along a processing path with the connected legs and thighs in an inverted attitude;
    cutting into the meat between the leg and thigh as each connected leg and thigh moves along the processing path;
    engaging the meat at the cut formed in the meat between the leg and thigh with a meat stripping means, moving the meat stripping means and the thigh bone with respect to each other so that the meat stripping means passes along the length of the thigh bone away from the leg and strips the meat from the thigh bone; and
    separating the thigh bone from the leg bone.

2. The method of claim 1 and further comprising the step of rotating the connected legs and thighs with respect to the meat stripper as the thigh meat is stripped from the thigh bone.

3. The method of claim 1 wherein the step of cutting into the meat between the connected legs and thighs comprises bending the leg and thigh at the connecting joint between the leg and thigh bones, and while the connected leg and thigh is bent, moving the joint between the leg and thigh into cutting engagement with a cutting blade.

4. The method of claim 1 wherein the step of separating the thigh bone from the leg bone further comprises the steps of bending the leg and thigh at the connecting joint between the leg and thigh, passing the joint into cutting engagement with a cutting blade, and severing the tendons which connect the thigh bone and the leg bone.

5. The method of claim 1 wherein the step of moving the connected legs and thighs along a processing path further comprises inserting the knuckle of the leg remote from the thigh into a bone holding means, and suspending each connected leg and thigh from the knuckle of the leg.

6. An apparatus for removing the meat from an elongated thigh bone of a poultry part or the like while the thigh bone remains connected to the leg bone of the poultry part, comprising:
a support system;
a plurality of deboning modules mounted in spaced relationship with respect to one another on said support system, with each of said deboning modules including a bone holder for supporting a poultry leg and a pair of stripper blades for removing the meat of a poultry thigh;
power means for revolving said support system to move said deboning modules mounted thereon in series along a continuous processing path;
a cutting means positioned along said processing path for creating a guide incision in the meat on the thigh bone at the knuckle of the thigh bone closest to the leg bone;
a first cam means for moving said stripper blades upwardly and downwardly toward and away from said bone holder in response to said deboning module revolving about the processing path;
a second cam means for moving said stripper blades toward and away from each other from an open position spaced away from the poultry part to a closed position engaging the meat on the thigh bone of the poultry part in response to the said deboning module revolving about the processing path; and
whereby said stripper blades engage the thigh of the poultry part and strip the thigh meat in a downward direction from the thigh bone as said deboning module moves along the processing path.

7. The apparatus of claim 6 and further including means for turning the thigh bone about its length as the stripper blades engage the thigh bone and move along the bone away from said bone holder to scrape the meat from the thigh bone.

8. The apparatus of claim 6 wherein said first cutting means comprises a pair of positioning rails arranged in a parallel spaced relationship one above the others adjacent said support system, a positioning wheel mounted along said support system and rotating with the revolution of said support system for engaging a joint between the leg and thigh bones of the poultry part to bend the joint between said positioning rails to open the joint, and a pair of opposed stationary cutting blades straddling said positioning rails and aligned with the space between said positioning rails for engaging opposite sides of the joint between the leg bone and thigh bone to create a guide incision at the joint.

9. The apparatus of claim 6 wherein said second cutting means comprises upper and lower positioning rails arranged in a spaced parallel relationship above one another and positioned adjacent said support system, a positioning wheel mounted along said support system and rotating with said support system for engaging a joint between the leg bone and the thigh bone of the poultry part to urge the leg into contact with said upper positioning rail and to urge the thigh bone into contact with said lower positioning rail with the joint bent open between said positioning rails, and a stationary cutting blade aligned between said positioning rails for engaging the opened joint and separating the thigh bone from the leg of the poultry part.

10. The apparatus of claim 6 and further including a rotary cutting disk positioned along said support system preceding said second cutting means for separating any meat remaining attached to the thigh bone after said stripping blades have moved along the length of the thigh bone away from said bone holder to scrape the meat from the thigh bone.

11. An apparatus for removing the meat from the thigh bone of a poultry part or the like while the thigh remains connected to a leg of the poultry part, comprising:
a support system;
a plurality of holders mounted upon said support system, each of said holders constructed and arranged for supporting a leg of a poultry part with its thigh extending from the leg;
a power means for moving said holders and the poultry parts supported thereby in sequence along a processing path;
a meat removal means for removing the meat from the thigh bone in response to the poultry parts being moved along the processing path; and
a separating means for separating the connected legs and thigh bones of the poultry parts.

12. The apparatus of claim 11 wherein said meat removal means comprises a pair of parallel meat stripping plates opposed to one another and defining an elongated slot therebetween for receiving the poultry parts carried by said bone holders, with at least a portion of said stripping plates being sloped away from the processing path so as to engage and pull the thigh meat downwardly along the length of the thigh bone as a poultry part passes between said meat stripping plates.

13. The apparatus of claim 12 and further including a pair of stationary cutting blades forming the opposing edges of said meat stripping plates.

14. The apparatus of claim 11 and wherein said meat removal means comprises a pair of stripper plates movable toward and away from each other so as to engage the thigh and movable along the length of the thigh bone so as to urge the meat along the length of the thigh bone.

15. The apparatus of claim 11 wherein said separating means comprises parallel upper and lower positioning rails, a positioning wheel adjacent said positioning rails and rotating with said support system for engaging a joint between the leg and thigh bone of the poultry part to force the leg into contact with said upper positioning rail and the thigh bone into contact with said lower positioning rail and bending the joint open between said positioning rails, and a stationary cutting blade aligned between said positioning rails for engaging the opened joint for separating the thigh bone from the leg of the poultry part.

16. The apparatus of claim 11 and further including a means for rotating the thigh bone about its length as the thigh bone passes between said meat removal means to scrape the meat from the bone.

17. A method of removing the meat from thighs of poultry parts while the thighs remain connected -to their legs, comprising the steps of: supporting the leg with the thighs extending from the legs;
- moving the legs and thighs in spaced series along a processing path;
- as each poultry part is moved along the processing path, engaging the thigh with a meat removal means and progressively moving the meat of the thigh along the length of the thigh bone with the meat removal means until the meat is substantially removed from the thigh bone; and
- separating the thigh bone and the leg bone after the meat has been removed from the thigh bone.

18. The method of claim 17 and further comprising the step of creating an initial incision in the meat on the thigh bone at the joint between the leg and thigh before the meat is moved from the thigh bone by the meat removal means.

19. The method of claim 17 wherein the step of separating the leg and thigh bone includes bending the connected leg bone and the thigh bone at the joint between the bones to open the joint, and cutting the tendons connecting the bones to separate the thigh bone from the leg bone.

20. The method of claim 17 and further comprising the step of rotating the connected leg bone and thigh bone with respect to the meat removal means as the meat is moved along the length of the thigh bone.

21. The method of claim 17 and further comprising the step of engaging any strips of thigh meat clinging to the thigh bone after the meat has been substantially removed from the thigh bone with a cutting blade, and cutting with the cutting blade the clinging strips of meat from the thigh bone.

22. The method of claim 17 and wherein the step of progressively moving the meat along the length of the thigh bone comprises the step of contacting the thigh bone with the opposed stripping surfaces of the meat removal means at the initial incision created in the meat of the thigh bone.

23. A method of removing meat from thighs of poultry parts while the thighs remain connected to their legs comprising the steps of:
- supporting the poultry parts by the legs with the thighs extending from the legs;
- moving the legs and thighs in series along a processing path; and
- as each poultry part moves along the processing path, moving the meat of the thigh along the length of the thigh bone until the meat is substantially removed from the thigh bone.

* * * * *